United States Patent

Saita

[11] Patent Number: 5,805,274
[45] Date of Patent: Sep. 8, 1998

[54] PHOTOGRAPHIC PRINTER UTILIZING A PHOTOACTIVATED LIQUID-CRYSTAL LIGHT VALVE IN ORDER TO ENHANCE IMAGE PROCESSING

[75] Inventor: Hirofumi Saita, Kanagawa, Japan

[73] Assignee: Fuji Photo Film Co., Ltd., Kanagawa, Japan

[21] Appl. No.: 613,767

[22] Filed: Feb. 28, 1996

[30] Foreign Application Priority Data

Mar. 3, 1995 [JP] Japan ................................. 7-044610

[51] Int. Cl.⁶ .......................... G03B 27/80; G03B 27/52; G03B 27/70
[52] U.S. Cl. .................... 355/38; 355/60; 355/66; 348/743; 348/761; 348/766; 349/1; 349/2; 349/3
[58] Field of Search .................... 348/742, 743, 348/761, 762, 763, 766, 768; 349/1, 3, 5, 6, 7, 8, 9; 355/35, 38, 60, 66, 31

[56] References Cited

U.S. PATENT DOCUMENTS

| 5,036,353 | 7/1991 | Sakamoto | 355/72 |
| 5,235,437 | 8/1993 | Katagiri et al. | 358/471 |
| 5,327,263 | 7/1994 | Katagiri et al. | 358/471 |
| 5,430,523 | 7/1995 | Tanibata | 355/32 |
| 5,657,395 | 8/1997 | Hirota | 382/163 |

FOREIGN PATENT DOCUMENTS

| 64-10819 | 2/1989 | Japan | G03B 27/72 |
| 6-43551 | 2/1994 | Japan | G03B 27/32 |

OTHER PUBLICATIONS

"Liquid Crystals—Applications", Chapter 10: *Photoconductive Crystal Displays,* Okano and Kobayashi, 1985, pp. 223–229 (Baifukan).

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

A photographic printer has a lamp which projects light through a cut-off filter, a filter unit, and a diffusion plate. The light travels further through a film negative, an objective lens, and to a polarizing beam splitter. The beam splitter provides the light to a spatial light modulator and to an exposing/enlarging lens. The spatial light modulator includes a light modulating layer of a homeotropically oriented nematic liquid crystal having a negative dielectric anisotropy. Layers of transparent electrodes in the spatial light modulator are provided with a predetermined voltage of a predetermined frequency. A write CRT, controlled by a controller and control unit, provides light to the spatial light modulator so that the light from the beam splitter can be modulated with an appropriate correction. The modulated light and the light from the beam splitter are made incident on a photographic color paper. The photographic printer has improved compensation for blur caused by dust on the optical path. Each pixel or minute region is controlled for reflectance.

20 Claims, 10 Drawing Sheets

PHOTOGRAPHIC PRINTER UTILIZING A PHOTOACTIVATED LIQUID-CRYSTAL LIGHT VALVE IN ORDER TO ENHANCE IMAGE PROCESSING

BACKGROUND OF THE INVENTION

1. Field of the Invention

The present invention relates to a photographic printer, and more particularly to a photographic printer for exposing a photosensitive material by illuminating a transparent original image.

2. Description of the Related Art

In a photographic printer for controlling exposure for each minute region, a technique has been proposed in which matrix electrodes comprised of a multiplicity of transmittance elements are disposed between the transparent original image and an illuminating means for illuminating the transparent original image, and the transmittance of the transmittance elements is simultaneously varied in correspondence with the transparent original image, so as to control exposure for each minute region (refer to Japanese Patent Application Publication No. 64-10819.

Further, a technique has been proposed in which an alternate image is prepared on another medium from a transparent original image while controlling the transmittance for each minute region in correspondence with the transparent original image, and a photosensitive material is exposed by the light transmitted through the alternate image so as to form a new duplicate image (refer to Japanese Patent Application Laid-Open No. 6-43551.

In the field of color television projectors, a technique is known in which an image is displayed on a screen by using a photoconductive liquid-crystal light panel (Okano and Kobayashi: "Liquid Crystals—Applications, "Chapter 10: Photoconductive Liquid Crystal Displays, pp. 223–229 (1985)).

However, with the technique disclosed in Japanese Patent Application Publication No. 64-10819, there has been a limitation in the formation of minute regions due to constraints in electrical connection to the matrix electrodes and constraints in the formation of the electrodes. For this reason, there has been a drawback in that when the color and densities of gradation-blurred portions and other corrupted portions are corrected in correspondence with the transparent original image, boundaries between sections become conspicuous in the form of image blur.

In addition, with the technique disclosed in Japanese Patent Application Laid-Open No. 6-43551, it is difficult to form an alternate image of a sufficient transmittance and a high resolution by using a liquid crystal display, a ferroelectric substance, such as lead zirco-titanate doped with lanthanum (PLZT), or a ferromagnetic substance, such as an iron garnet crystal. Hence, there has been a drawback in that the exposure time becomes long, and a decline in the image quality results.

SUMMARY OF THE INVENTION

The present invention has been devised to overcome the above-described problems, and it is an object of the present invention to provide a photographic printer which is capable of rendering a correction less conspicuous even if color or density correction is made.

To this end, in accordance with a first aspect of the present invention, there is provided a photographic printer comprising: an illuminating member having color adjusting filters and adapted to illuminate a transparent original image by light transmitted through each of the color adjusting filters; a reflecting member having a light modulating layer capable of changing a reflectance distribution, the reflecting member being adapted to reflect light transmitted through the transparent original image; a controlling member for controlling the reflectance of the reflecting member for each minute region; and a printing member for causing the light reflected by the reflecting member to form an image on a photosensitive surface of a photosensitive material so as to effect printing.

In accordance with a second aspect of the present invention, there is provided a photographic printer comprising: an illuminating member having color adjusting filters and adapted to illuminate a transparent original image by light transmitted through each of the color adjusting filters; a reflecting member having a reflecting surface capable of changing a reflectance distribution, the reflecting member being adapted to reflect light transmitted through the transparent original image; a photometrically measuring member provided in such a manner as to be capable of dividing the transparent original image into a multiplicity of pixels, and adapted to photometrically measure the transparent original image by effecting color separation into at least three primary colors; a controlling member for determining a density of the transparent original image on the basis of a photometric value, for determining a density to be formed on a predetermined photosensitive material on the basis of the determined density value and characteristic data of the photosensitive material, and for controlling the reflectance of the reflecting surface for each minute region such that an image is formed on the photosensitive material with a density which is substantially equal to a density to be formed on the predetermined photosensitive material on the basis of a difference between the two densities; and a printing member for causing the light reflected by the reflecting member to form an image on a photosensitive surface of the photosensitive material so as to effect printing.

In accordance with a third aspect of the present invention, there is provided a photographic printer comprising: an illuminating member having color adjusting filters and adapted to illuminate a transparent original image by light transmitted through each of the color adjusting filters; a reflecting member having a light modulating layer capable of changing a reflectance distribution, the reflecting member being adapted to reflect light transmitted through only each of the color adjusting filters; a controlling member for controlling the reflectance of the reflecting member for each minute region; and a printing member for causing the light reflected by the reflecting member and the light transmitted through the transparent original image to form an image on a photosensitive surface of a photosensitive material so as to effect printing.

In accordance with a fourth aspect of the present invention, in the photographic printer according to the first, second, and third aspects of the invention, the reflecting member is a photoactivated liquid-crystal light valve of a reflecting type, and the controlling member controls the reflectance by means of one of light from a light source having a surface illuminant and scanning light using laser light.

In accordance with the first aspect of the present invention, the illuminating member has color adjusting filters. The illuminating member illuminates a transparent original image by light transmitted through each of the color adjusting filters. The reflecting member has a light modulating layer capable of changing a reflectance distribution when seen from a photosensitive material. The controlling member controls the reflectance of the reflecting member for each minute region. The light transmitted through the transparent original image is reflected by the reflecting member. The printing member causes the light reflected by the reflecting member to form an image on the photosensitive surface of the photosensitive material so as to effect printing. Thus, since the reflectance of the reflecting surface can be controlled for each minute region, the light transmitted through the transparent original image can be corrected for each minute region to print an image onto the photosensitive surface of the photosensitive material.

In accordance with the second aspect of the present invention, the illuminating member has color adjusting filters. The illuminating member illuminates a transparent original image by light transmitted through each of the color adjusting filters. The reflecting member has a light modulating layer capable of changing a reflectance distribution when seen from a photosensitive material. The photometrically measuring member divides the transparent original image into a multiplicity of pixels, and photometrically measures the transparent original image by effecting color separation into at least three primary colors. The controlling member determines the density of the transparent original image on the basis of a photometric value, and determines a density to be formed on a predetermined photosensitive material on the basis of the determined density value and characteristic data of the photosensitive material. Further, the controlling member controls the reflectance of the reflecting surface for each minute region such that an image is formed on the photosensitive material with a density which is substantially equal to a density to be formed on the predetermined photosensitive material on the basis of a difference between the aforementioned two densities. The light transmitted through the transparent original image is reflected by the reflecting member. The printing member causes the light reflected by the reflecting member to form an image on the photosensitive surface of the photosensitive material so as to effect printing. Thus, since the reflectance of the reflecting surface is controlled for each minute region such that an image is formed on the photosensitive material with a density which is substantially equal to a density to be formed on the predetermined photosensitive material, it is possible to obtain a print which is free of a defect in the image quality.

In accordance with the third aspect of the present invention, the illuminating member has color adjusting filters. The illuminating member illuminates a transparent original image by light transmitted through each of the color adjusting filters. The reflecting member has a light modulating layer capable of changing a reflectance distribution when seen from a photosensitive material. The controlling member controls the reflectance of the reflecting member for each minute region. The light transmitted through only each of the color adjusting filters is reflected by the reflecting member. The printing member causes the light reflected by the reflecting member and the light transmitted through the transparent original image to form an image on the photosensitive surface of the photosensitive material so as to effect printing. Thus, since the reflectance of the reflecting surface can be controlled for each minute region, the light transmitted through the transparent original image can be corrected for each minute region to print an image onto the photosensitive surface of the photosensitive material.

In accordance with the fourth aspect of the present invention, in the photographic printer according to the first to third aspects of the invention, the reflecting member is a photoactivated liquid-crystal light valve of a reflecting type, and the controlling member controls the reflectance by means of one of light from a light source having a surface illuminant and scanning light using laser light.

As described above, in accordance with the first to fourth aspects of the present invention, it is possible to obtain an advantage in that since the reflectance of the reflecting surface can be controlled for each minute region, the light transmitted through the transparent original image can be corrected for each minute region to print an image onto the photosensitive surface of the photosensitive material.

Further, in accordance with the second to fourth aspects of the present invention, it is possible to obtain an advantage in that since the reflectance of the reflecting surface is controlled for each minute region such that an image is formed on the photosensitive material with a density which is substantially equal to a density to be formed on the predetermined photosensitive material, it is possible to obtain a print which is free of a defect in the image quality.

Furthermore, in accordance with the third and fourth aspects of the present invention, it is possible to obtain the advantage that since the reflectance of the reflecting surface can be controlled for each minute region, the light transmitted through the transparent original image can be corrected for each minute region to print an image onto the photosensitive surface of the photosensitive material.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of a photographic printer in accordance with the present invention.

Figure 1:
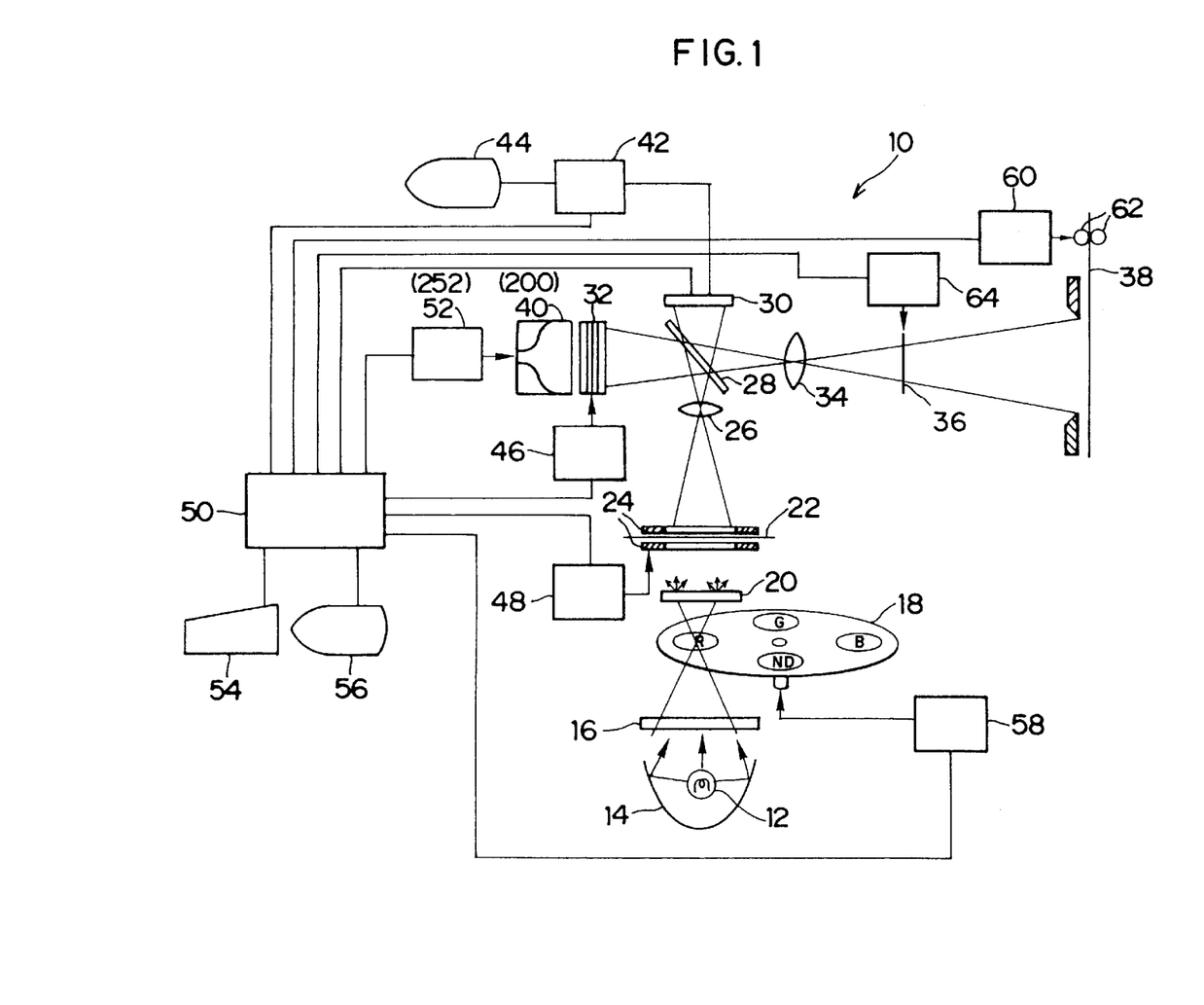
FIG. 1 is a diagram schematically illustrating the configuration of a photographic printer 10.

As shown in FIG. 1, a photographic printer 10 has a lamp 12 which is installed inside a reflector 14. A cut-off filter 16 for cutting off infrared and ultraviolet rays is disposed above the reflector 14 for cutting off wavelengths which are not required for exposure. A disk-shaped filter unit 18, in which three color filters of red (R), green (G), and blue (B) and a neutral-density (ND) filter are fixed, is disposed above the cut-off filter 16. The filter unit 18 is rotatively driven by a filter driving unit 58 so that each of the R, G, B, and ND filters stops at a position on the optical path.

A diffusion plate 20 for diffusing the light which passes through the filter is disposed above the filter unit 18. A film carrier 24 for transporting a frame to be printed to the optical path while nipping a negative film 22 is disposed above the diffusion plate 20. The film carrier 24 is driven by a carrier driving unit 48. An objective lens 26 is disposed above the film carrier 24. A polarizing beam splitter 28 for causing the light transmitted through the frame to be printed to branch off in two directions is disposed above the objective lens 26 such that its plane is inclined 45° with respect to the optical path. An image area sensor 30 is disposed above the polarizing beam splitter 28. The image area sensor 30 can be changed over between an imaging mode for measuring image blur and imaging the frame to be printed and a tricolor separation and photometric measurement mode for photometrically measuring the light transmitted through the frame to be printed for each color of R, G, and B.

A spatial light modulating element 32 (to be described later in detail) is disposed on the side of the polarizing beam splitter 28, and a predetermined voltage of a predetermined frequency is applied to the spatial light modulating element 32 from a modulating-element controlling unit 46. A write CRT 40, which serves as a light source having a surface illuminant with a fluorescent material of a high luminous intensity coated thereon, is disposed on the side of the spatial light modulating element 32 which is opposite the side thereof where the polarizing beam splitter 28 is disposed. This write CRT 40 modulates a light modulating later 32F (to be described layer in detail) of the spatial light modulating means 32 by light, and displays an image corresponding to the negative film 22. The writing of an image by the write CRT 40 is controlled by a CRT controlling unit 52. Meanwhile, an exposing/enlarging lens 34 for printing an image onto a color paper 38 serving as a photosensitive material is disposed on the side of the polarizing beam splitter 28 which is opposite the side thereof where the spatial light modulating element 32 is disposed. A shutter 36 is disposed between the exposing/enlarging lens 34 and the color paper 38. The shutter 36 is opened and closed by a shutter driving unit 64. Incidentally, the color paper 38 is moved to a predetermined exposing position by the power of a roller driving unit 60 for driving drawing rollers 62.

The image area sensor 30 is connected to a monitor-image processing unit 42, which is, in turn, connected to a monitor CRT 44. The image area sensor 30, the monitor-image processing unit 42, the modulating-element controlling unit 46, the carrier driving unit 48, the CRT controlling unit 52, the filter driving unit 58, the roller driving unit 60, and the shutter driving unit 64 are connected to a controller 50. Also connected to the controller 50 are a keyboard 54 for operating the controller 50 and a display 56 for displaying the operating condition of the controller 50.

Figure 2:
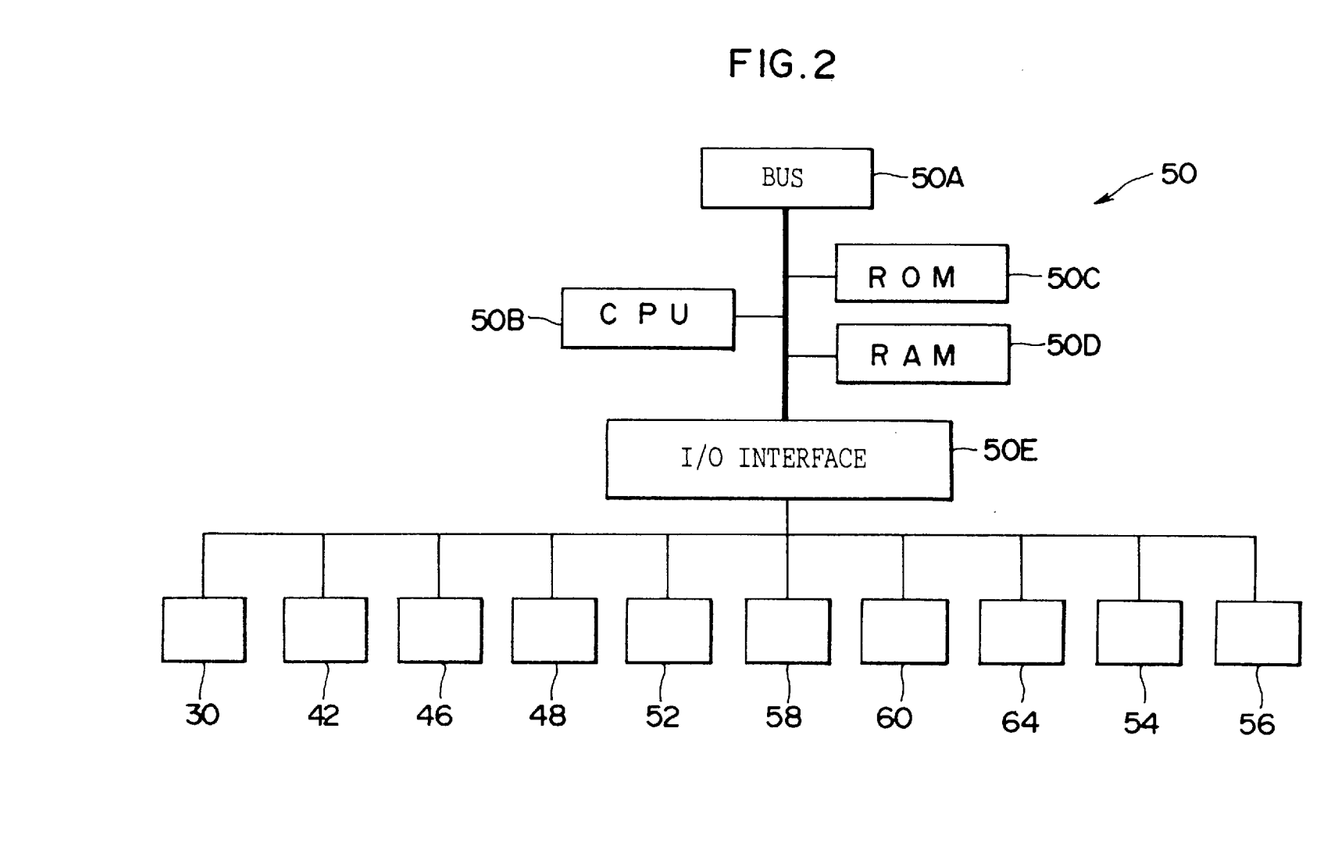
FIG. 2 is a block diagram illustrating the configuration of a controller.

As shown in FIG. 2, the controller 50 has a bus 50A. A CPU 50B, a ROM 50C, a RAM 50D, and an I/O interface 50E are connected to the bus 50A.

Figure 3:
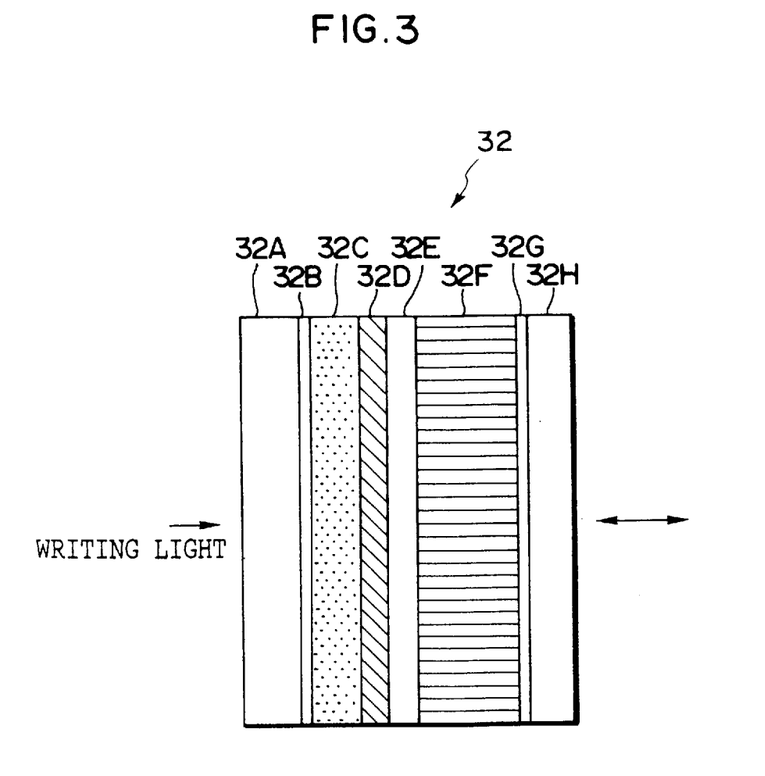
FIG. 3 is a diagram illustrating the arrangement of a spatial light modulating element.

As shown in FIG. 3, the spatial light modulating means 32 is arranged such that a glass substrate layer 32A, a transparent electrode layer 32B, a photoconductive layer 32C, a light shielding layer 32D, a dielectric reflecting layer 32E, a light modulating layer 32F, a transparent electrode layer 32G, and a glass substrate layer 32H are consecutively superposed one on top of another. The aforementioned predetermined voltage of the predetermined frequency is applied between the transparent electrode layers 32B and 32G. In the light modulating layer 32F, a nematic liquid crystal having a negative dielectric anisotropy is homeotropically oriented. Orientation layers for homeotropically orienting the liquid crystal are respectively provided on both sides of the light modulating layer 32F. The resistance value of the photoconductive layer 32C is selected such that the resistance value $R_{OFF}$ per unit when the light is not incident upon the glass substrate layer 32A side and the resistance value $R_{ON}$ per unit when the light is incident thereupon assume the following Formula (1) with respect to the resistance value $R_{LC}$ per unit of the light modulating layer 32F.

$$R_{OFF} > R_{LC} > R_{ON} \tag{1}$$

For this reason, when the light is not incident upon the glass substrate layer 32A side, a major portion of the applied voltage is applied to the photoconductive layer 32C, and a sufficient voltage is not applied to the light modulating layer 32F connected in series to the photoconductive layer 32C. Consequently, the electro-optical effect based on the liquid crystal is not produced in the light modulating layer 32F. When the light is incident upon the glass substrate layer 32A side, the resistance in the photoconductive layer 32C is lowered, and a voltage is applied to the light modulating layer 32F, thereby producing the electro-optical effect. In a case where the light emitted from the glass substrate layer 32A side is image information having an intensity distribution (if an image is written by the write CRT 40), a voltage distribution corresponding to that intensity distribution is applied to the light modulating layer 32F, so that an image corresponding to the written image is formed in the light modulating means 32F by the electro-optical effect. The dielectric reflecting layer 32E is constituted by a dielectric multilayered film which is formed of $ZnS/MgF_2$ or the like. For this reason, if the light is incident upon the glass substrate 32H side, the image formed by the aforementioned electro-optical effect is reflected by the dielectric reflecting layer 32E, and exits toward the glass substrate 32H side. Incidentally, the light shielding-layer 32D absorbs the light which has passed through the dielectric reflecting layer 32E out of the light incident upon the glass substrate 32H side, thereby preventing that light from being incident upon the photoconductive layer 32C.

Figure 4:
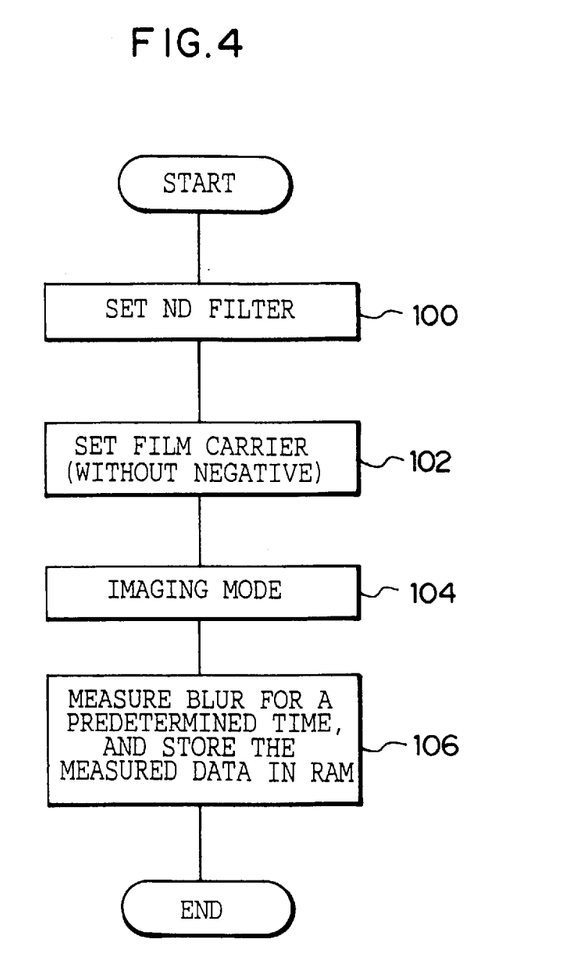
FIG. 4 is a flowchart illustrating a procedure for measuring the image blur caused by dust.
Figure 5:
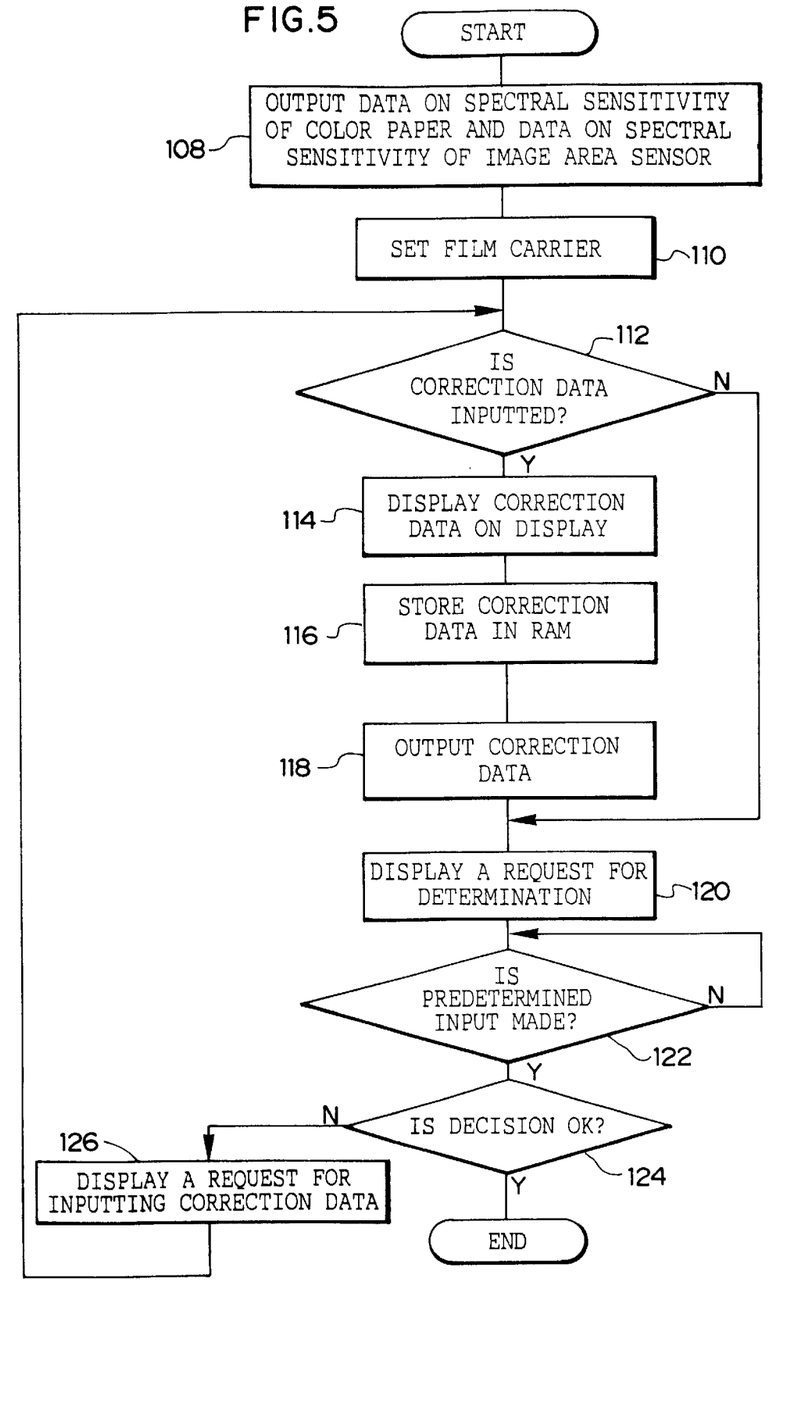
FIG. 5 is a flowchart illustrating a procedure for displaying on a CRT 44 an image whose finished print is estimated.
Figure 6:
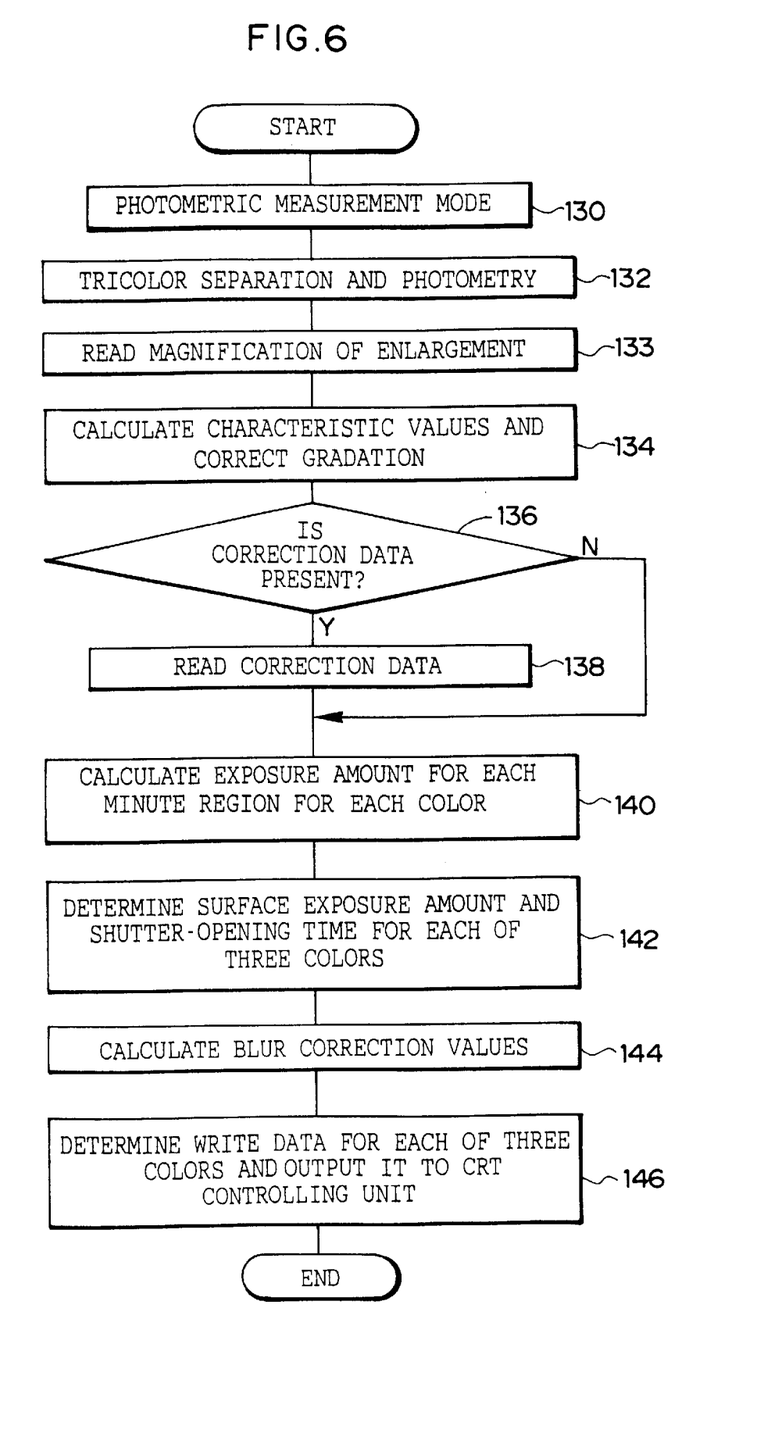
FIG. 6 is a flowchart illustrating a correcting procedure corresponding to the sensitivity of a color paper.
Figure 7:
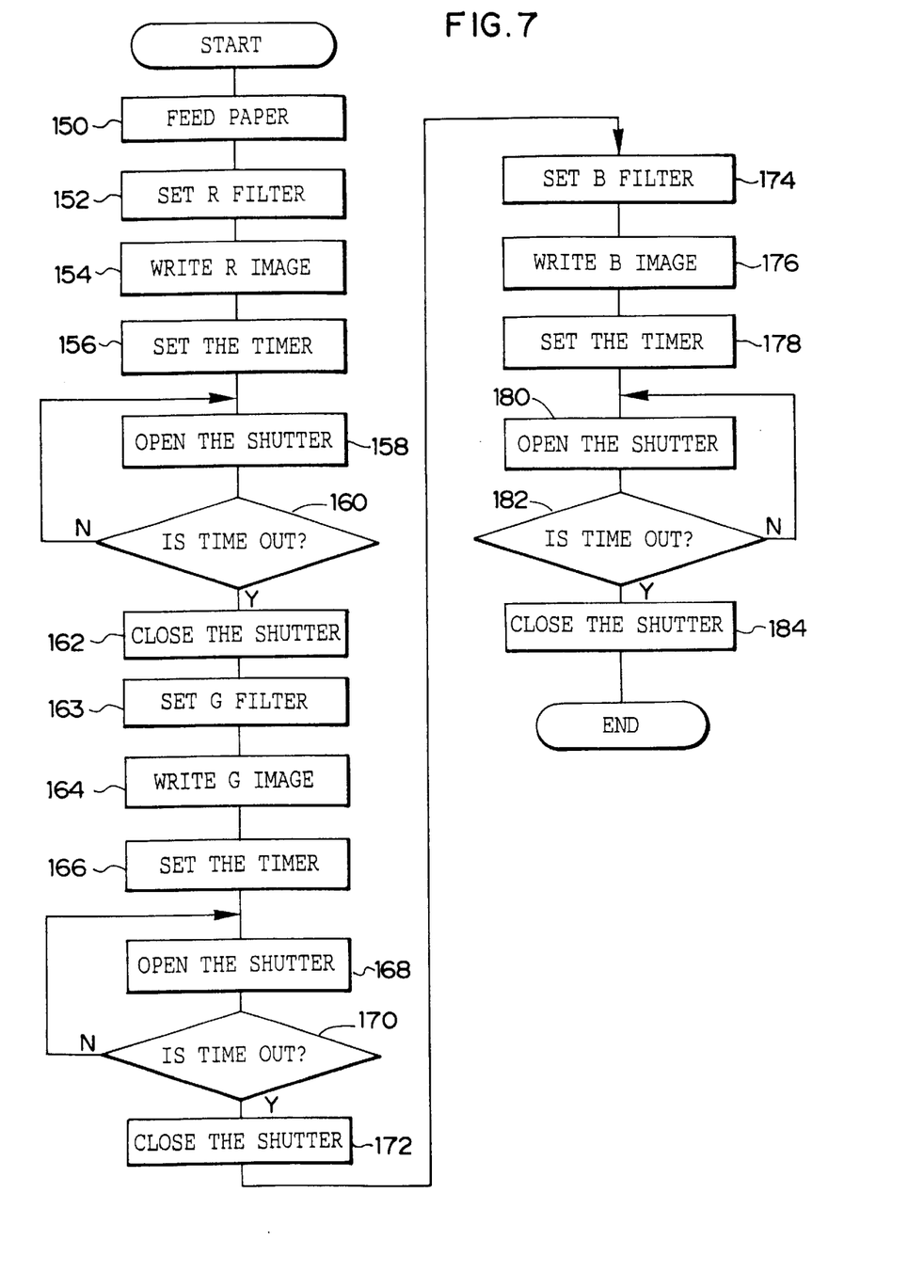
FIG. 7 is a flowchart illustrating a procedure for exposing the three colors of R, G, and B.

Referring now to FIGS. 4 to 8, a description will be given of the operation of the photographic printer 10. FIG. 4 shows a flowchart illustrating a procedure for measuring the image blur caused by dust on the optical path. FIG. 5 shows a flowchart illustrating a procedure for displaying on the CRT 44 an image whose finished print is estimated. FIG. 6 shows a flowchart illustrating a correcting procedure corresponding to the sensitivity of the color paper 38. FIG. 7 shows a flowchart illustrating a procedure for exposing the three colors of R, G, and B. Hereafter, a description will be given in the order of the measurement of image blur, the displaying of an image whose finished print is estimated, correction, and exposure. Incidentally, it is assumed that the temperature of the lamp 12 has reached a predetermined stable temperature.

In Step 100 in FIG. 4, the filter driving unit 58 is driven to set the ND filter in the optical path. In an ensuing Step 102, the carrier driving unit 48 is driven to move the film carrier 24 into the optical path in a state in which the negative film 22 is not nipped. Consequently, the light from the lamp 12 is consecutively transmitted through the cut-off filter 16, the ND filter, the diffusing plate 20, the film carrier 24, the objective lens 26, and the polarizing beam splitter 28, and reaches the image area sensor 30. Then, in Step 104, the image area sensor 30 is set to the imaging mode. In an ensuing Step 106, the image blur is measured for a predetermined time, and the measured data is stored in the RAM 50D, thereby finishing the measurement of the image blur.

In Step 108 in FIG. 5, data on the spectral sensitivity of the color paper 38 and data on the spectral sensitivity of the image area sensor 30 are outputted to the monitor-image processing unit 42. In an ensuing Step 110, the frame to be printed is set in the optical path in a state in which the negative film 22 is nipped by the film carrier 24. Here, since the image area sensor 30 has been set in the imaging mode (refer to Step 104), the video signals of the imaged negative image are sent to the monitor-image processing unit 42. The monitor-image processing unit 42 effects correction in such a manner as to adjust the spectral sensitivity to the A/D conversion, the negative/positive conversion, and the spectral sensitivity of the color paper, and sends the corrected video signals to the monitor CRT 44. Consequently, an image whose finished print is estimated is displayed on the monitor CRT 44.

Next, in Step 112, a determination is made as to whether or not correction data has been inputted by the keyboard 54. As for the correction data, the density data and the color correction data can be inputted for each pixel of the write CRT 40. If NO is the answer in the determination, the operation proceeds to Step 120. Meanwhile, if YES is the answer in the determination, the inputted correction data is displayed on the display 56 in an ensuing Step 114, and the correction data is stored in the RAM in Step 116. Next, in Step 118, the correction data is sent to the monitor-image processing unit 42. Consequently, the monitor-image processing unit 42 sends to the monitor CRT 44 video signals incorporating the correction data sent thereto from the controller 50, and a final image whose finished print is estimated is displayed on the monitor CRT 44.

In an ensuing Step 120, a document requesting an operator to determine whether printing is to be effected with the image whose finished print is estimated and which is displayed on the monitor CRT 44 is displayed on the display 56. In Step 122, a determination is made as to whether or not an input for the decision has been made. If NO is the answer in the determination, the operation returns to Step 122 to wait until an input for the decision is made. Meanwhile, if YES is the answer in the determination, in an ensuing Step 124 a determination is made as to whether or not the inputted decision is OK. If NO is the answer in the determination, in Step 126 a document requesting the operator to input the correction data is displayed on the display 56, and the operation returns to Step 112. On the other hand, if YES is the answer in the determination, the procedure for displaying the image whose finished print is estimated ends.

In Step 130 in FIG. 6, the image area sensor 30 is set in the photometric measurement mode. In an ensuing Step 132, the filter driving unit 58 is driven to consecutively set the R filter, the G filter, and the B filter in that order in the optical path, and the relative intensity of the light transmitted through the frame to be printed is photometrically measured by the image area sensor 30 for each of the three colors.

Figure 8:
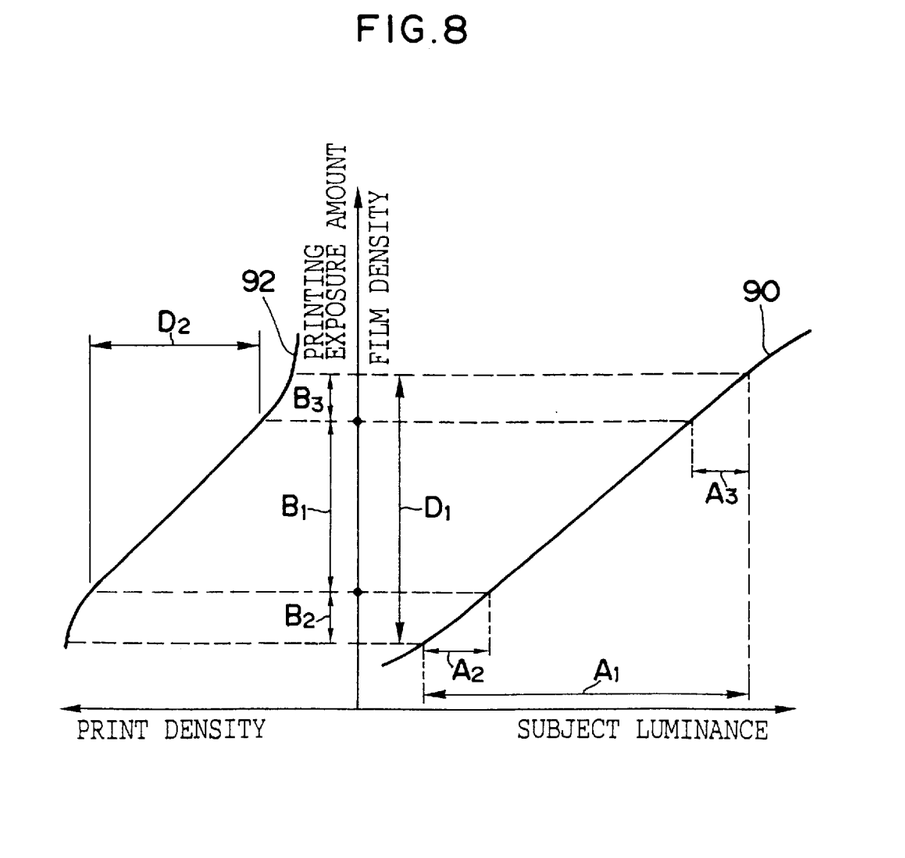
FIG. 8 is a diagram illustrating a characteristic of a negative film and a characteristic of a color paper.

In an ensuing Step 133, since the exposure time differs depending on the magnification of enlargement, the magnification of enlargement inputted by the keyboard 54 is read. Then, in Step 134, a large area transmission density (LATD) value corresponding to each color and the density of the transparent original image for each minute region are calculated, and the density corresponding to each color to be formed on the color paper 38 is calculated on the basis of the sensitivity data of the color paper 38 and the calculated density of the transparent original image for each minute region. If the luminance of a subject is taken as the abscissa and the film density as the ordinate as shown in FIG. 8, the characteristic of the negative film can be represented by a negative film characteristic curve 90. Additionally, if the print density is taken as the abscissa and the amount of printing exposure as the ordinate, the characteristic of the color paper can be expressed by a color paper characteristic curve 92. In the drawing, $A_1$ denotes the luminance range of the subject, $D_1$ denotes the range of fluctuation of the density of the negative film, and $D_2$ denotes the range of fluctuation of the density of the color paper. In general, when a photosensitive material is exposed from a negative film, since the sensitivity range of the photosensitive material is narrower than the sensitivity range of the negative film, the image becomes whitened or blackened on the color paper in regions $B_2$ and $B_3$ in the drawing. For this reason, in Step 134, after the calculation of the aforementioned density, gradation correction is effected for each minute region with respect to each color on the basis of the difference between the density of the transparent original image and the density formed on the color paper. Incidentally, the relationship between the exposure amount and the intensity of light for writing in the spatial light modulating element 32 is stored in advance in the ROM 50C as a gradation control curve.

Next, in Step 136, a determination is made as to whether or not the correction data has been stored in the RAM 50D. If YES is the answer in the determination, the correction data is fetched in an ensuing Step 138. Meanwhile, if NO is the answer in the determination, the operation proceeds to Step 140. In Step 140, the exposure amount is calculated for each minute region for each of the three colors, R, G, and B. In an ensuing Step 142, the amount of surface exposure and the shutter-opening time are determined for each of the three colors. In an ensuing Step 144, the image blur already measured is fetched from the RAM 50D, and blur correction values for the image are calculated. Then, in Step 146, write data is determined for each of the three colors, and the write data is outputted to the CRT controlling unit 52, thereby completing the correction procedure.

In Step 150 in FIG. 7, the roller driving unit 60 is driven to feed the color paper 38. In an ensuing Step 152, the R filter is set in the optical path. Then, in Step 154, a corrected reflected image with respect to the R image is written in the write CRT 40 by controlling the CRT controlling unit 52. Consequently, an image is formed in the light modulating layer 32F. A timer is set in Step 156, and the shutter is opened in an ensuing Step 158. As a result, part of the light transmitted through the frame to be printed in the negative film 22 branches off by the polarizing beam splitter 28, and proceeds toward the spatial light modulating element 32. This transmitted light is modulated by the image formed in the light modulating layer 32F, and is reflected by the dielectric reflecting layer 32E. Accordingly, the transmitted image on the frame to be printed is modulated into the image formed in the light modulating layer 32F, and the image is formed on the color paper 38 by means of the exposing/enlarging lens 34 and is printed. Then, in Step 160, a determination is made as to whether or not the time is out. If NO is the answer in the determination, the operation returns to Step 158. Meanwhile, if YES is the answer in the determination, the shutter is closed in an ensuing Step 162.

Then, in Step 163, the G filter is set in the optical path, and in an ensuing Step 164 a corrected reflected image with respect to the G image is written in the write CRT 40. As a result, in the same way as in the case of the R image the transmitted light is modulated by the image formed in the light modulating layer 32F, and is reflected by the dielectric reflecting layer 32E, and an image is formed on the color paper 38 by means of the exposing/enlarging lens 34 and is printed. The timer is set in Step 166, and the shutter is opened in an ensuing Step 168. Then, in Step 170, a determination is made as to whether or not the time is out. If NO is the answer in the determination, the operation returns to Step 168. Meanwhile, if YES is the answer in the determination, the shutter is closed in an ensuing Step 172.

Then, in Step 174, the B filter is set in the optical path, and in an ensuing Step 176 a corrected reflected image with respect to the B image is written in the write CRT 40. As a result, in the same way as in the case of the R image the transmitted light is modulated by the image formed in the light modulating layer 32F, and is reflected by the dielectric reflecting layer 32E, and an image is formed on the color paper 38 by means of the exposing/enlarging lens 34 and is printed. The timer is set in Step 178, and the shutter is opened in an ensuing Step 180. Then, in Step 182, a determination is made as to whether or not the time is out. If NO is the answer in the determination, the operation returns to Step 180. Meanwhile, if YES is the answer in the determination, the shutter is closed in an ensuing Step 184, thereby completing the operation of the photographic printer 10.

Figure 9:
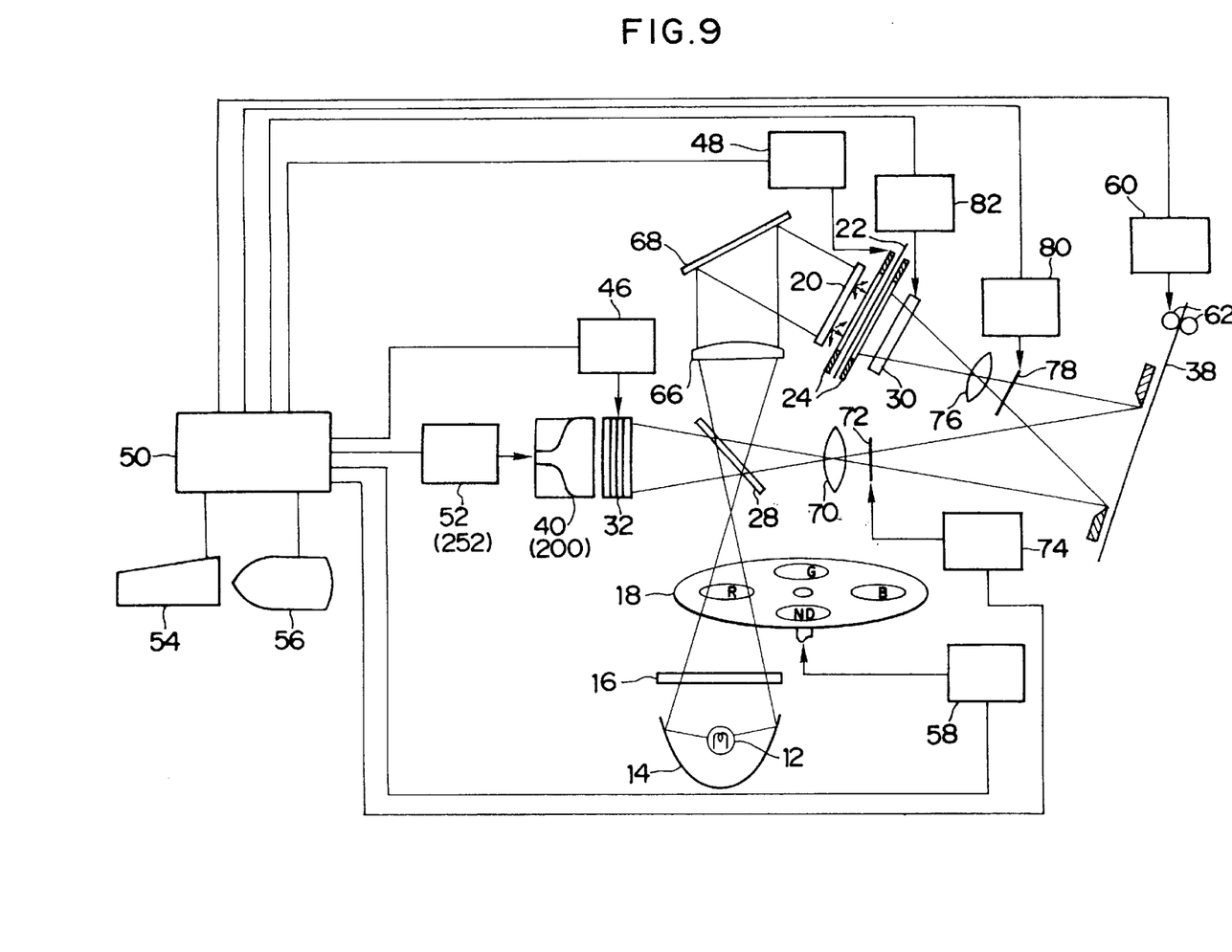
FIG. 9 is a diagram schematically illustrating the configuration of a photographic printer in accordance with a second embodiment.

Referring now to FIG. 9, a description will be given of a second embodiment of the photographic printer in accordance with the present invention. In this embodiment, the light reflected from the spatial light modulating element and the light transmitted through the transparent original image are synthesized by using different optical axes to effect exposure. Incidentally, since the configuration of this embodiment is substantially similar to that of the first embodiment, identical component parts will be denoted by the same reference numerals, and a detailed description thereof will be omitted. Hereafter, a description will be given of different portions.

A collimator lens 66 for converting the light transmitted through the polarizing beam splitter 28 into parallel rays is disposed above the polarizing beam splitter 28. A reflecting mirror 68 for reflecting the parallel rays is disposed above the collimator lens 66. An exposing/enlarging lens 70 for allowing the image reflected by the dielectric reflecting layer 32E to be formed on the color paper 38 is disposed on the side of the polarizing beam splitter 28 which is opposite the side thereof where the spatial light modulating element 32 is disposed. A shutter 72 is disposed between the exposing/enlarging lens 70 and the color paper 38. The shutter 72 is opened and closed by a shutter driving unit 74. The diffusing plate 20 and the film carrier 24 are disposed in that order diagonally below the reflecting mirror 68. The image area sensor 30 is disposed diagonally below the film carrier 24, and the image area sensor 30 is adapted to move toward this side in the drawing by the power of a sensor driving unit 82 or in the opposite direction thereto. An exposing/enlarging lens 76 for allowing an image transmitted through the frame to be printed to be formed on the color paper 38 is located diagonally below the image area sensor 30. A shutter 78 is disposed between the exposing/enlarging lens 76 and the color paper 38. The shutter 78 is opened and closed by a shutter driving unit 80.

Next, a description will be given of the operation of the photographic printer in accordance with this embodiment. After Step 102, the sensor driving unit 82 is driven to move the image area sensor 30 into the optical path, and the operation proceeds to Step 106 (see FIG. 4). After Step 150, the sensor driving unit 82 is driven to allow the image area sensor 30 to retract from the optical path, and the operation proceeds to Step 152 (see FIG. 7). In Steps 158, 168, and 180, the shutters 72 and 78 are opened simultaneously (see FIG. 7).

In accordance with the above-described embodiment, since it is possible to correct the gradation for each pixel of the write CRT 40, it is possible to obtain a print in which the loss of image detail is overcome and image portions with blurred gradations in the transparent original image are restored. In addition, it is possible to print a transparent original image by superimposing another image thereon. For this reason, in cases where an image is printed with a fine pattern including characters or the like superimposed thereon, it is possible to obtain a print in which the characters or the like exhibit smooth contours.

In addition, since the difference between the density of the transparent original image and the density formed on the color paper is corrected for each minute region with respect to each color, it is possible to obtain a print which is free of a defect in the image quality. Accordingly, it is possible to prevent image degradations in which the face of a human figure standing in front of a bright background becomes blurred or the background becomes whitened when exposure is effected in correspondence with the human figure.

Further, since the compensation for image blur is carried out, even if dust is attached to the cutoff filter, the filter unit, or the like, it is possible to obtain a print which is free of image degradation.

Furthermore, in the above-described embodiment, although an image with its blurred portions compensated for is not displayed on the monitor CRT, an image with its blurred portions compensated for can be displayed on the monitor CRT if the blur correction values of the image are transmitted to the monitor-image processing unit. Hence, it is possible to display a print whose finished print is estimated more accurately.

Although in the above embodiments a description has been given of a photographic printer for a mini-lab for which an operator is required to make a decision for each frame to be printed, an arrangement may be provided such that the operator may be required to make a decision collectively prior to exposure. In that case, the present invention can also be applied to a photographic printer of a large lab type.

Furthermore, in not only photographic printers but also printing-plate making machines and electrophotographic apparatuses, it is possible to form a reproduced image in which an image obtained directly from an original and a gradation-corrected image based on the spatial light modulating element are synthesized by using the above-described optical system.

Figure 10:
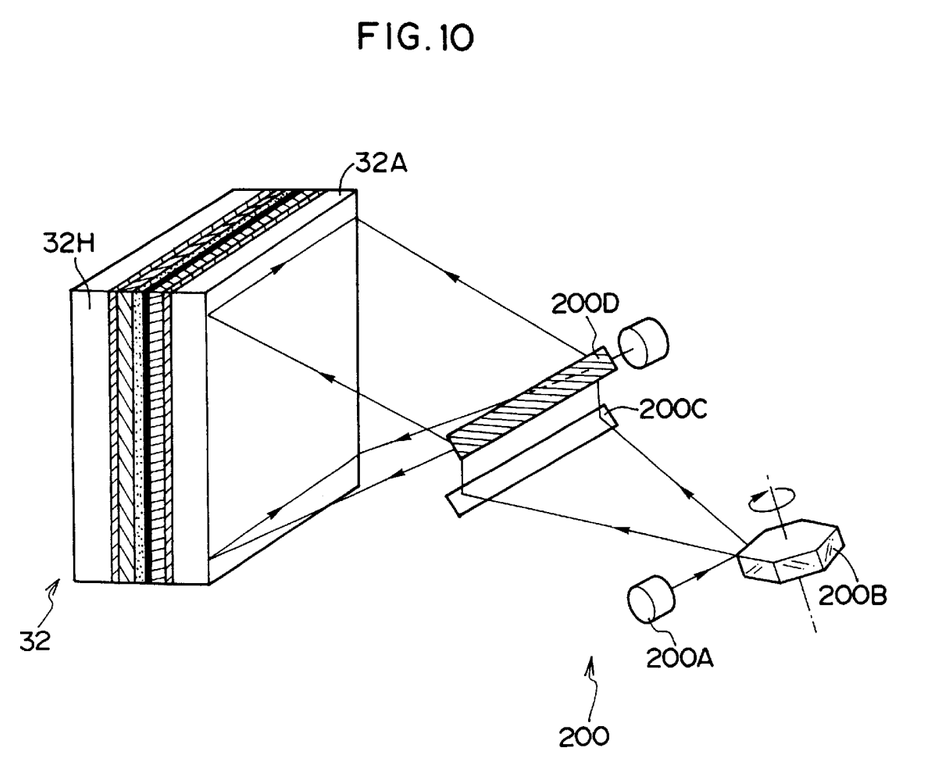
FIG. 10 is a schematic diagram illustrating another example of a controlling member.

In addition, although in the above-described first and second embodiments the write CRT 40 and the CRT controlling unit 52 are used as controlling members, the present invention is not limited to the same. For example, it is possible to use a scanning optical system 200 which is capable of changing the reflectance of a reflecting member by means of the scanning laser light as shown in FIG. 10. In this case, a laser controlling unit 252 controls the operation of at least one of a laser 200A, a polygon mirror 200B, and reflecting mirrors 200D and 200C.

It will be appreciated that the invention is to be understood as being broader than the few particular embodiments described in the foregoing pages. That is, a certain level of generalization may be achieved by thinking of the individual components in terms of their overall function when operating together. Thus, the lamp 12, reflector 14, cut-off filter 16, disked filter unit 18, and diffusion plate 20 may collectively be thought of as an illuminating member. Likewise, the shutter 36, rollers 62, exposing/enlarging lens 34, and driving units 60 and 64 may collectively be thought of as a printing member. Similarly, the spatial light modulator 32 may be generalized as a reflecting member that is capable of changing a reflectance distribution. Thus, the equivalents of the disclosed spatial light modulator 32 will be recognized by one of skill as coming within the overall ambit of the invention. In a similar fashion, the write CRT 40, the CRT control unit 52, the modulating element control unit 46, the monitor/image processing unit 42, and the various other control units might be understood, more generally, as describing a controlling member. Along the same lines, the image area sensor 30 may generally be thought of as a photometric measuring member. For the sake of clarity, it is to be noted that the negative film 22 may be generalized as a transparent original image, and that the color photographic paper 38 may be thought of as a photosensitive material with a photosensitive surface.

What is claimed is:

1. A photographic printer comprising:
    an illuminating member having color adjusting filters and adapted to illuminate a transparent original image by light transmitted through each of said color adjusting filters;
    a reflecting member having a light modulating layer capable of changing a reflectance distribution, said reflecting member being adapted to reflect light transmitted through the transparent original image;
    a controlling member controlling the reflectance of said reflecting member for each minute region; and
    a printing member causing the light reflected by said reflecting member to form an image on a photosensitive surface of a photosensitive material so as to effect printing.

2. A photographic printer according to claim 1, wherein said reflecting member comprises a reflecting photoconductive liquid-crystal light bulb.

3. A photographic printer according to claim 1, wherein said controlling member controls the reflectance by means of one of: (1) light from a light source having a surface illuminant, and (2) scanning light using laser light.

4. A photographic printer according to claim 3, wherein:
    said controlling member controls the reflectance by means of the light from said light source having said surface illuminant;
    said controlling member is disposed in proximity to a surface of said reflecting member which is opposite a transmitted-light incident surface thereof; and
    said controlling member has a CRT modulating said light modulating layer of said reflecting member.

5. A photographic printer comprising:
    an illuminating member having color adjusting filters and adapted to illuminate a transparent original image by light transmitted through each of said color adjusting filters;
    a reflecting member having a reflecting surface capable of changing a reflectance distribution, said reflecting member being adapted to reflect light transmitted through the transparent original image;
    a photometric measuring member dividing the transparent original image into a plurality of pixels, and photometrically measuring the transparent original image by effecting color separation at least into three primary colors;
    a controlling member determining a density of the transparent original image on the basis of a photometric value, determining a density to be formed on a predetermined photosensitive material on the basis of the determined density value and characteristic data of the photosensitive material, and controlling the reflectance of the reflecting surface for each minute region such that an image is formed on the photosensitive material with a density substantially equal to a density to be formed on the predetermined photosensitive material on the basis of a difference between the two densities; and
    a printing member causing the light reflected by said reflecting member to form an image on a photosensitive surface of the photosensitive material so as to effect printing.

6. A photographic printer according to claim 5, wherein said reflecting member includes a photoconductive liquid-crystal light bulb of a reflecting type.

7. A photographic printer according to claim 5, wherein said controlling member controls the reflectance by means of one of: (1) light from a light source having a surface illuminant and (2) scanning light using laser light.

8. A photographic printer according to claim 7, wherein:
    said controlling member controls the reflectance by means of the light from said light source having said surface illuminant;
    said controlling member is disposed in proximity to a surface of said reflecting member opposite a transmitted-light incident surface thereof; and
    said controlling member has a CRT modulating a light modulating layer of said reflecting member.

9. A photographic printer according to claim 5, further comprising:
    a beam splitter splitting the light transmitted through the transparent original image into:
        a light beam incident upon said photometric measuring member, and
        a light beam incident upon said reflecting member.

10. A photographic printer according to claim 5, wherein said photometric measuring member is an image area sensor with an imaging mode for measuring image blur and imaging a frame to be printed, and with a tricolor separation and photometric measurement mode for photometrically measuring the light transmitted through the frame to be printed for red, for green, and for blue.

11. A photographic printer according to claim 10, wherein, in the imaging mode, said image area sensor uses a neutral density (ND) filter as one of said color adjusting filters to measure the image blur in the light emitted from said illuminating member and transmitted through said ND filter without the transparent original image being interposed.

12. A photographic printer according to claim 10, wherein, in the tricolor separation and photometric measurement mode, said image area sensor photometrically measures light transmitted through the transparent original image and each of a plurality of color filters serving as the color adjusting filters, said plurality of color filters including a red filter, a green filter, and a blue filter.

13. A photographic printer comprising:
    an illuminating member having color adjusting filters and adapted to illuminate a transparent original image by light transmitted through each of said color adjusting filters;

a reflecting member having a light modulating layer capable of changing a reflectance distribution, said reflecting member being adapted to reflect light transmitted through only each of said color adjusting filters;

a controlling member controlling the reflectance of said reflecting member for each minute region; and a printing member for causing the light reflected by said reflecting member and the light transmitted through the transparent original image to form an image on a photosensitive surface of a photosensitive material so as to effect printing.

14. A photographic printer according to claim 13, wherein said reflecting member includes a photoconductive liquid-crystal light bulb of a reflecting type.

15. A photographic printer according to claim 13, wherein said controlling member controls the reflectance by means of one of; (1) light from a light source having a surface illuminant and (2) scanning light using laser light.

16. A photographic printer according to claim 15, wherein:

said controlling member controls the reflectance by means of the light from said light source having said surface illuminant;

said controlling member is disposed in proximity to a surface of said reflecting member opposite a surface thereof upon which the light transmitted through each of said color adjusting filters is incident; and said controlling member has a CRT for modulating said light modulating layer of said reflecting member.

17. A photographic printer according to claim 13, further comprising:

a beam splitter for splitting the light transmitted through said color adjusting filters into:

a light beam incident upon said reflecting member, and a light beam incident upon the transparent original image.

18. A photographic printer according to claim 13, further comprising:

a photometric measuring member dividing the transparent original image into a plurality of pixels and photometrically measuring the light transmitted through the frame;

said photometric measuring member being an image area sensor with:

an imaging mode for measuring image blur and imaging a frame to be printed, and a tricolor separation and photometric measurement mode for photometrically measuring the light transmitted through the frame to be printed for red, for green, and for blue.

19. A photographic printer according to claim 18 wherein, in the imaging mode, said image area sensor uses an ND filter as one of said color adjusting filters and measures the image blur in the light emitted from said illuminating member and transmitted through said ND filter without the transparent original image being interposed.

20. A photographic printer according to claim 18 wherein, in the tricolor separation and photometric measurement mode, said image area sensor photometrically measures light transmitted through the transparent original image and each of a plurality of color filters serving as the color adjusting filters, the plurality of color filters including a red filter, a green filter, and a blue filter.

* * * * *